(12) United States Patent
Cook et al.

(10) Patent No.: US 9,712,246 B2
(45) Date of Patent: Jul. 18, 2017

(54) INFRARED AUDIO SYSTEMS AND RELATED METHODS

(71) Applicant: Listen Technologies Corporation, Bluffdale, UT (US)

(72) Inventors: Dee Cook, Draper, UT (US); Tracy A. Bathurst, South Jordan, UT (US); Mark Simon, Thousand Oaks, CA (US)

(73) Assignee: Listen Technologies Corporation, Bluffdale, UT (US)

( * ) Notice: Subject to any disclaimer, the term of this patent is extended or adjusted under 35 U.S.C. 154(b) by 0 days.

(21) Appl. No.: 14/942,779

(22) Filed: Nov. 16, 2015

(65) Prior Publication Data

US 2017/0141851 A1    May 18, 2017

(51) Int. Cl.
*H04B 10/50*    (2013.01)

(52) U.S. Cl.
CPC .................. *H04B 10/502* (2013.01)

(58) Field of Classification Search
CPC .................................... H04B 10/502
USPC ........................................ 398/182
See application file for complete search history.

(56) References Cited

U.S. PATENT DOCUMENTS

| | | | | |
|---|---|---|---|---|
| 2004/0208629 | A1* | 10/2004 | Van Asten | H04B 10/1141 398/164 |
| 2010/0310089 | A1* | 12/2010 | Hintzen | H04R 3/02 381/81 |
| 2014/0197314 | A1* | 7/2014 | Afrooze | H05B 33/0842 250/338.1 |
| 2015/0285462 | A1* | 10/2015 | Shimoda | B60Q 1/24 362/218 |
| 2016/0023124 | A1* | 1/2016 | Wang | H04R 27/00 381/77 |

FOREIGN PATENT DOCUMENTS

JP        2004135226 A    4/2004

OTHER PUBLICATIONS

"Communications Systems LBB 451x/00 Integrus Radiators," Bosch Security Systems, vol. 6, No. 1, Nov. 2013, 3 pages.
(Continued)

*Primary Examiner* — Dalzid Singh
(74) *Attorney, Agent, or Firm* — TraskBritt

(57) ABSTRACT

A transmitter for transmitting audio signals via infrared light includes a first mounting board and a first plurality of narrow angle LED emitters and a first plurality of wide angle LED emitters attached to a front surface of the first mounting board. The first plurality of narrow angle LED emitters and the first plurality of wide angle LED emitters are configured to emit a beam of infrared light having a wide portion and a narrow portion, the wide portion being proximate the LED emitters and the narrow portion being distal to the LED emitters. An infrared audio system includes a transmitter and an expansion transmitter. The expansion transmitter may include a second plurality of narrow angle LED emitters and a second plurality of wide angle LED emitters. A method of making a transmitter includes attaching a plurality of narrow angle LED emitters and a plurality of wide angle LED emitters to a mounting board of a transmitter.

19 Claims, 8 Drawing Sheets

(56) References Cited

OTHER PUBLICATIONS

"HCS-5100 Digital Infrared Language Distribution System," Taiden Industrial Co. Installation and Operating Manual vol. 1, No. 11, Jan. 2015, 65 pages.
"HCS-5100T Series Digital Infrared Radiator," Taiden Industrial Co. HCS-5100 Series Digital Infrared Language Distribution System Datasheet, Sep. 2008, 3 pages.
"Stationary IR," Listen Technologies Corporation System Design Guide and Manual, 2008, 141 pages.
"SI 30 Instructions for Use," Sennheiser Electronic GmbH & Co. KG Infrared receivers instructions for use, Feb. 1999, 40 pages.
"WIR TX75/b Two-Channel Infrared Transmitter," Williams Sound WIR TX75/b Manual and User Guide, 2012, 16 pages.
Extended European Search Report for European Application No. 16197632.9-1874 dated Mar. 30, 2017, 9 pages.

\* cited by examiner

INFRARED AUDIO SYSTEMS AND RELATED METHODS

TECHNICAL FIELD

This disclosure relates generally to infrared audio systems for transmitting audio signals and to methods of making and using infrared audio systems.

BACKGROUND

Infrared audio systems are commonly used to transmit audio signals in environments in which radio frequency signals are impractical or not desired. The audio is modulated (e.g., FM modulation) for transmission, and the modulated signal is transmitted using one or more infrared light emitting diodes (LEDs) (also referred to herein as "LED emitters"). The LED emitters emit a modulated infrared light (hereinafter "IR light") to a remote receiver that converts (e.g., demodulates) the IR light back into an audio signal and eventually back to reproducing the sound which is heard by a listener.

The LED emitters are typically low power, and an array of the LED emitters is typically required to provide enough IR light for the infrared audio system to work in a large area (e.g., conference room, auditorium, concert hall, outdoor venues, etc.). Conventional systems use LEDs that have a directional lens formed over the diodes of the LED emitters to focus the IR light in one general direction and to increase the power (e.g., amount and intensity of the light) emitted in that direction. A typical viewing angle of transmission (e.g., emitted light) from a single LED emitter used in such a conventional system is about 10° to 20° off center. Conventional systems use an array of these LED emitters that each have a narrow pattern (of IR light) such that the combined effect provides enough IR light for a receiver to be used at a practical distance from the LED emitters in many environments. A narrow pattern in conventional systems may work well for long and narrow rooms, but if a room is rectangular or square, the coverage area (e.g., area throughout which the infrared audio system emits IR light) provided by the infrared audio system on lateral sides of the room is poor in that there may be "dead zones" in which the IR signal may not be strong enough to produce the required signal for the receiver.

Wider viewing angles of transmission are available from some LED emitter manufacturers. However, due to the spreading of the IR light over a wider area, the number of LED emitters required to cover an entire area of a typical room is, in many cases, cost prohibitive. For example, a common approach used in the industry to attempt to increase the coverage area has been to use multiple (identical) infrared audio systems and point the infrared audio systems in different directions to get adequate coverage. This approach has the potential to cause gaps in coverage due to the IR light from the different infrared audio systems arriving out of phase (e.g., having latencies) with respect to each other and cancelling out the signal in certain locations within the room. Such cancelations may also cause dead zones within the room. In addition, requiring the user to purchase a large number of conventional systems with a coverage area having a single narrow pattern may increase costs—particularly for large areas. Other conventional approaches include changing the direction that the individual LED emitters point when mounted on the circuit board of the transmitting apparatus. In other words, one group points straight forward, while other groups of the array of LED emitters points outward at different angles in order to widen the combined coverage area emitted from the IR transmitter. In each group, however, the LED emitters are identical in terms of their individual lenses and emitting characteristics. Mounting the LED emitters in the array to point in different directions may add cost to the manufacturing process as well as difficulty in precision when the mounting occurs.

BRIEF SUMMARY

In some embodiments, the present disclosure includes a transmitter for transmitting audio signals via infrared light. The transmitter may include an enclosure, a mounting board, a plurality of narrow angle LED emitters, and a plurality of wide angle LED emitters. The enclosure may have a top panel, a bottom panel, a front panel, and a rear panel. The front panel and rear panel may extend between the top panel and the bottom panel. The mounting board may be disposed within the enclosure and proximate the front panel of the enclosure. The plurality of narrow angle LED emitters may be disposed on a front surface of the mounting board. The plurality of wide angle LED emitters may be disposed on a front surface of the mounting board.

In some embodiments, the present disclosure includes an infrared audio system for transmitting audio signals via infrared light. The infrared audio system may include a transmitter and at least one expansion transmitter. The transmitter may include a first mounting board, a first plurality of narrow angle LED emitters mounted to the first mounting board, and a first plurality of wide angle LED emitters mounted to the first mounting board. The at least one expansion transmitter may be connected to the transmitter via at least one cable. The at least one expansion transmitter may include a second mounting board, a second plurality of narrow angle LED emitters mounted to the second mounting board; and a second plurality of wide angle LED emitters mounted to the second mounting board.

In some embodiments, the present disclosure includes a method of making a transmitter for transmitting audio signals via infrared light. The method may include attaching a plurality of narrow angle LED emitters to a mounting board of the transmitter, the plurality of narrow angle LED emitters having a viewing angle within the range of 30° to 50°, and attaching a plurality of wide angle LED emitters to the mounting board of the transmitter, the plurality of wide angle LED emitters having a viewing angle within the range of 100° to 140°.

DETAILED DESCRIPTION

Figure 1:
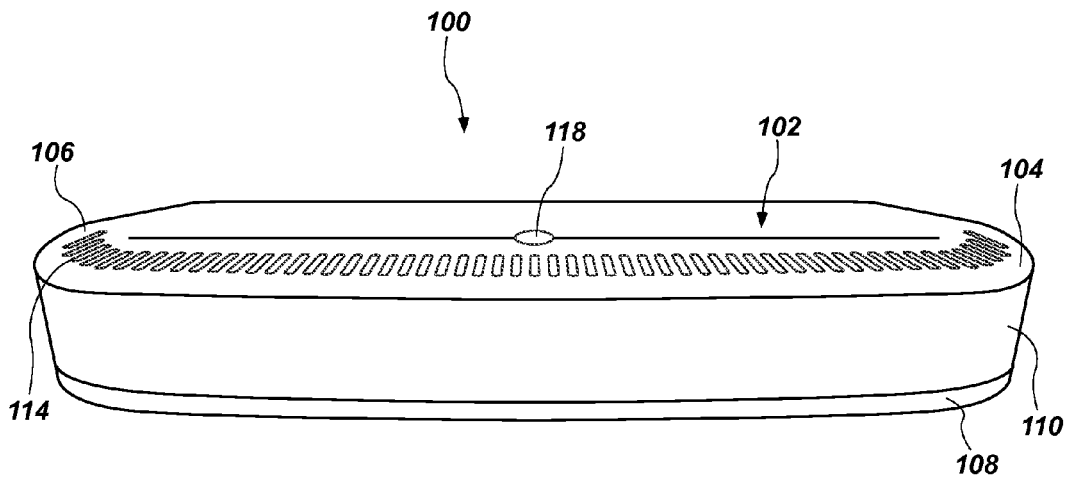
FIG. 1 is a front perspective view of a transmitter of an infrared audio system according to an embodiment of the present disclosure.

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration.

As used herein, any relational term, such as "first," "second," etc., is used for clarity and convenience in understanding the disclosure and accompanying drawings, and does not connote or depend on any specific preference or order, except where the context clearly indicates otherwise. These designations may also be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, any relational term, such as "first," "second," "over," "beneath," "top," "bottom," "underlying," "up," "down," etc., is used for clarity and convenience in understanding the disclosure and accompanying drawings, and does not connote or depend on any specific preference, orientation, or order, except where the context clearly indicates otherwise. For example, these terms may refer to an orientation of elements of the infrared audio system relative to a surface of a table on which the infrared audio system may be positioned, mounted, and/or operated (e.g., as illustrated in the figures).

As used herein, the terms "vertical" and "horizontal" may refer to a drawing figure as oriented on the drawing sheet, and are in no way limiting of orientation of an apparatus, or any portion thereof, unless it is apparent that a particular orientation of the apparatus is necessary or desirable for operation in view of gravitational forces. For example, when referring to elements illustrated in the figures, the terms "vertical" or "horizontal" may refer to an orientation of elements of the infrared audio system relative to a table surface of a table to which the infrared audio system may be mounted and operated.

Some embodiments of the present disclosure include an infrared audio system for providing audio signals in environments where radio frequencies may be impractical or not desired. The infrared audio system may include a transmitter configured to emit a beam of infrared light having a wide portion proximate the transmitter and a narrow portion distal to the transmitter and extending from the wide portion of the beam of infrared light. The wide portion of the beam of infrared light may provide coverage in wide environments. The transmitter may include a plurality of narrow angle LED emitters and a plurality of wide angle LED emitters. Some embodiments of the present disclosure may include an infrared audio system having a transmitter and an expansion transmitter. The expansion transmitter may be used together with the transmitter to increase a size of the beam of infrared light emitted by the infrared audio system, and as a result, an amount of coverage of an environment. The expansion transmitter may also include a plurality of narrow angle LED emitters and a plurality of wide angle LED emitters.

Figure 2:
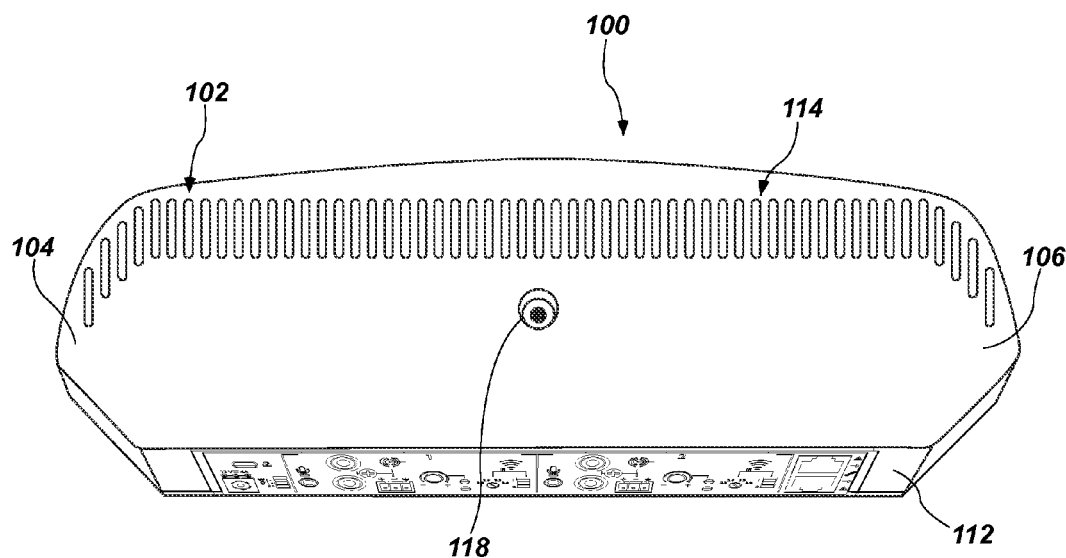
FIG. 2 is a top rear perspective view of the transmitter of the infrared audio system of FIG. 1.

FIG. 1 is a front perspective view of an infrared audio system 100 having an infrared (IR) transmitter 102 configured to generate audio signals that are transmitted using IR light. FIG. 2 is a rear perspective view of the transmitter 102 of the infrared audio system 100 of FIG. 1. Such a system 100 may be used in environments where radio frequencies are impractical and/or not desired. For example, the IR transmitter 102 may be used to provide audio signals in auditoriums, gymnasiums, performance halls, conference rooms, corporate boardrooms, courtrooms, training rooms, classrooms, theaters, outdoor venues, etc. The transmitter 102 may be configured to convert audio signals to infrared light (hereinafter "IR light") with the audio signals imbedded in the IR light (e.g., FM modulated) and to transmit the IR light for applications in, for example, assistive listening, audio description, or language interpretation. Modulation may be performed using a processor within the infrared audio system 100 configured to receive the audio signals, mix audio signals, and generate the outgoing signal that is transmitted through the IR emitters.

Receivers may be used in conjunction with the transmitter 102. The receivers may detect and receive the IR light, convert the IR light back into audio signals, and provide the audio signal to a sound producing device (e.g., headphone), which may be used by a listener. Demodulation may be performed by a processor incorporated within the receiver.

Referring to FIGS. 1 and 2 together, the transmitter 102 may include an enclosure 104 that includes a top panel 106, bottom panel 108, front panel 110, and an opposite rear panel 112. The top panel 106 may be disposed above and proximate to the bottom panel 108 and the front and rear panels 110, 112 may extend between the top and bottom panels 106, 108. A first plurality of vents 114 may extend through the top panel 106 and may facilitate dissipation of heat produced by electrical components disposed within the enclosure 104 of the transmitter 102. A second plurality of vents 116 may extend through the bottom panel 108 and may further facilitate dissipation of heat produced by the electrical components disposed within the enclosure 104 of the transmitter 102.

The transmitter 102 may include at least one mounting hole 118 for mounting the transmitter 102 within an environment wherein the transmitter 102 is intended to provide an audio signal to receivers. In some embodiments, the transmitter 102 may include at least one mounting hole 118 in one or more of the top panel 106 and the bottom panel 108 of the enclosure 104.

Figure 3:
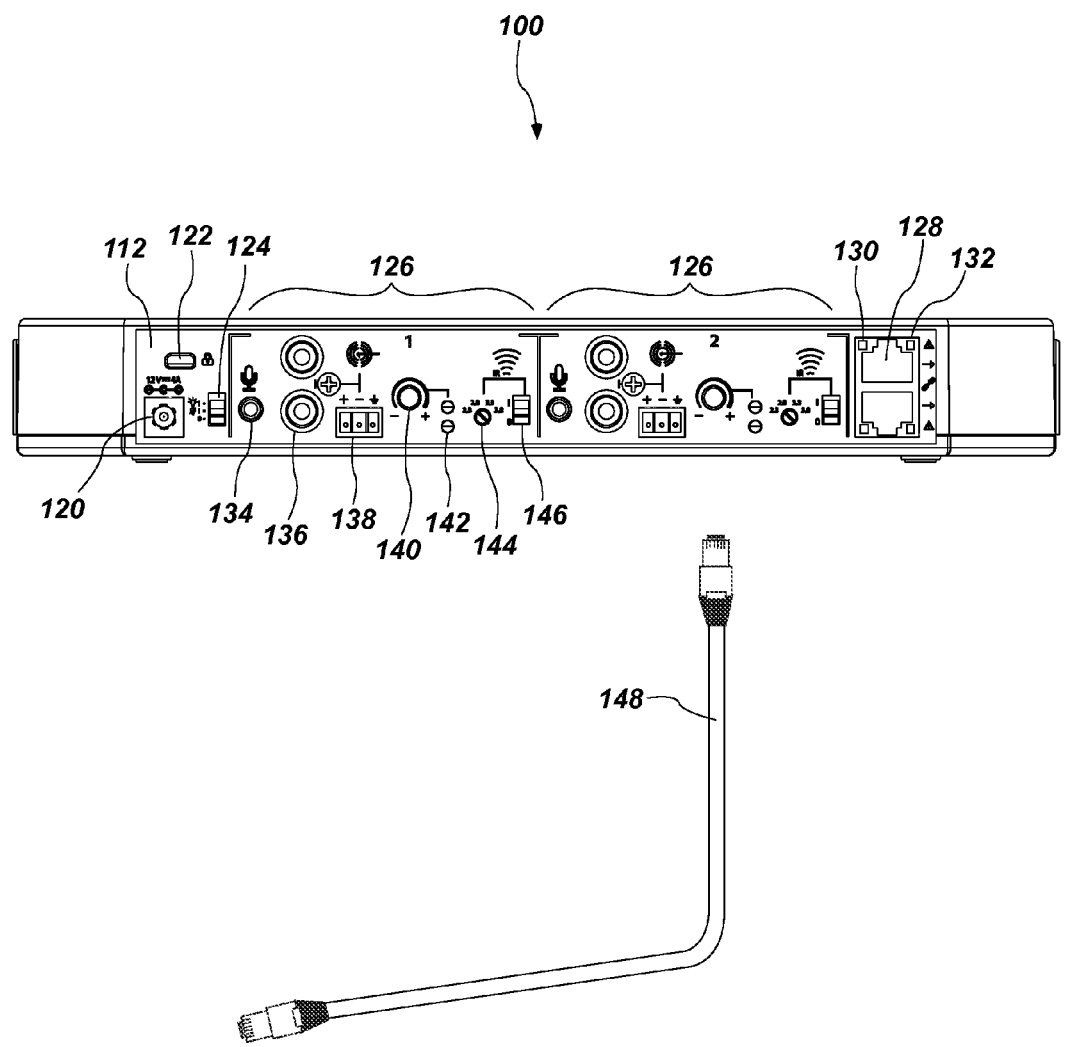
FIG. 3 is a rear side view of a rear panel of the transmitter of the infrared audio system of FIG. 1.

FIG. 3 is a rear view of the infrared audio system 100 of FIG. 1. In particular, the rear panel 112 of the enclosure 104 of the transmitter 102 is shown in further detail. The rear panel 112 may serve to provide electrical and audio connections between the transmitter 102 and the other devices. In some embodiments, the rear panel 112 may include a power input connector 120, a safety/security cable slot 122, a power switch 124, a plurality of channel audio connections 126, at least one expansion link output 128, a plurality of green LED power indicators 130, and a plurality of amber LED status indicators 132.

Each of the plurality of channel audio connections 126 includes a microphone input 134, an RCA input 136, a line input 138, a level control 140, a level indicator 142, a frequency selector 144, and a transmission on/off switch 146. The variety of available audio inputs may allow the transmitter 102 to be a more universal device that can be used with a variety of audio signal providing devices. The power input connector 120 may be connected to a power supply.

The power switch 124 may include a three-position switch that is located proximate the power input connector 120. The power switch 124 may include a top position, a middle position, and a bottom position. When the power switch 124 is in the top position, the transmitter 102 may be powered on and the green LED power indicators 130 may be active (e.g., lit) indicating that the transmitter 102 is powered on, as discussed in further detail below. When the power switch 124 is in the middle position, the transmitter 102 may also be powered on but the green LED power indicators 130 may be not active. When the power switch 124 is in the lower position, the transmitter 102 may be powered off and the green LED power indicators 130 may be not active.

Each microphone input 134 of the plurality of channel audio connections 126 may include a 3.5 mm tip sleeve condenser. Each RCA input 136 of the plurality of channel audio connections 126 may include two connectors. The line input 138 of each of the plurality of channel audio connections 126 may include a three pin Phoenix type connection. Each level control 140 of the plurality of channel audio connections 126 may be rotatable in a clockwise direction to increase an audio level emitted by the transmitter 102 and in a counterclockwise direction to decrease the audio level emitted by the transmitter 102. As used herein, the terms "audio level" may refer to a power and intensity of the IR light produced by the transmitter 102. As a result, the terms "audio level" may also refer to a size of an area throughout which the transmitter 102 emits the IR light. For example, when the audio level of the transmitter 102 is increased, the size of an area throughout which the transmitter 102 produces the IR light may be increased. Each level indicator 142 of the plurality of channel audio connections 126 may include a red LED and green LED located proximate the level control 140 of the plurality of channel audio connections 126. In some embodiments, the red LED and green LED may be used to determine the proper audio level adjustment.

Each frequency selector 144 of the plurality of channel audio connections 126 may allow a user to select a carrier frequency at which an IR light may be transmitted for a respective audio source that is connected to a respective channel audio connection 126 of the transmitter 102. As an example, each frequency selector 144 may include a four-position rotary selection switch. Each position of the four positions of the rotary selection switch may be associated with a particular frequency. For example, a first position of the four positions is set to transmit an IR light at 2.3 MHz, a second position of the four positions is set to transmit an IR light at 2.8 MHz, a third position of the four positions is set to transmit an IR light at 3.3 MHz, and a fourth position of the four positions is set to transmit an IR light at 3.8 MHz. Of course, it is contemplated that any number of different positions and corresponding frequencies may be used.

Each transmission on/off switch 146 of the plurality of channel audio connections 126 has an "up" position and a "down" position. When the transmission on/off switch 146 is in the "up" position, the IR light of the respective channel audio connection 126 may be active (e.g., being transmitted). When the transmission on/off switch 146 is in the "down" position, the IR of the respective channel audio connection 126 is not active (e.g., not being transmitted). In some embodiments, the transmitter 102 may transmit IR light at least two different channels simultaneously. For example, the transmitter 102 may have a single channel transmit mode and a double channel transmit mode. In the single channel transmit mode, the transmitter 102 may transmit an audio signal on a single channel (i.e., only one channel active). In the double channel transmit mode, the transmitter 102 may transmit a first audio signal on a first channel and a second audio signal on a second channel (i.e., two channels active). For example, each channel audio connection 126 of the plurality of channel audio connections 126 may have an audio source connected to the channel audio connection 126, and the transmitter 102 may transmit an IR light associated with each audio source connected to the transmitter 102. In some embodiments, the transmitter 102 may transmit an IR light for two different audio sources on two different channels.

Figure 6:
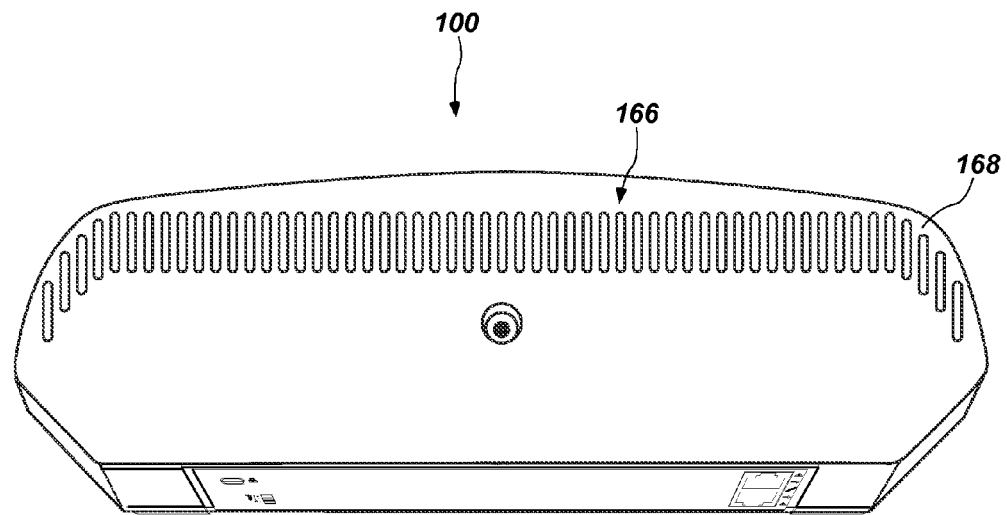
FIG. 6 is a top rear perspective view of an expansion transmitter of an infrared audio system according to an embodiment of the present disclosure.
Figure 7:
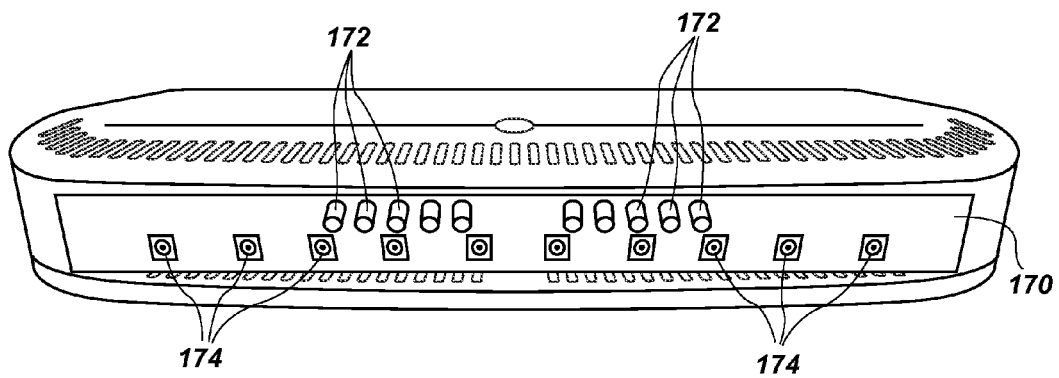
FIG. 7 is a front perspective view of the expansion transmitter of the infrared audio system of FIG. 6 with a front panel removed.
Figure 8:
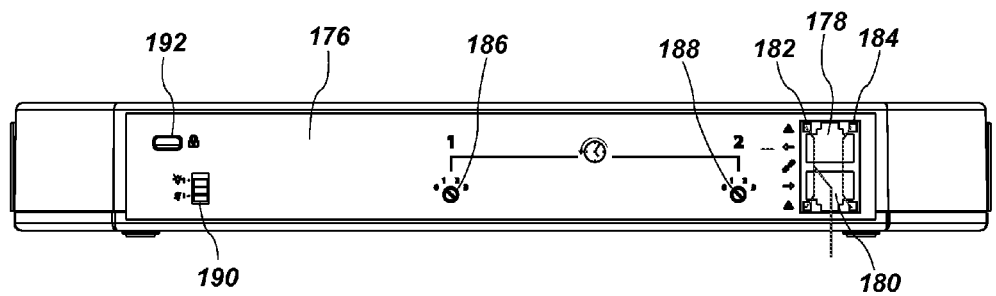
FIG. 8 is a rear side view of a rear panel of the expansion transmitter of the infrared audio system of FIG. 6.

The at least one expansion link output 128 may accept a cable 148 (e.g., as one option a Category 5 Enhanced cable ("CAT-5e cable") or other suitable cable) and may allow the transmitter 102 to add (e.g., be connected to) expansion radiators/transmitters that can increase an area covered by the transmitter 102 (e.g., can increase an area throughout which the transmitter 102 transmits the IR light), as discussed in further detail in regard to FIGS. 6-8. In some embodiments, the transmitter 102 may include at least two expansion link outputs 128.

The plurality of green LED power indicators 130 may indicate whether the transmitter 102 is powered on. The plurality of amber LED status indicators 132 may indicate whether an audio source is connected to the transmitter 102 or if there is a problem with LED emitters 152, 154 located proximate the front panel 110 of the transmitter 102 (discussed in further detail in regard to FIG. 4). Furthermore, when the plurality of amber LED status indicators 132 is solid (e.g., continuously illuminated), it may be an indication that an audio source is connected to the transmitter 102 and that the transmitter 102 is actively transmitting an IR light associated with the audio source.

Figure 4:
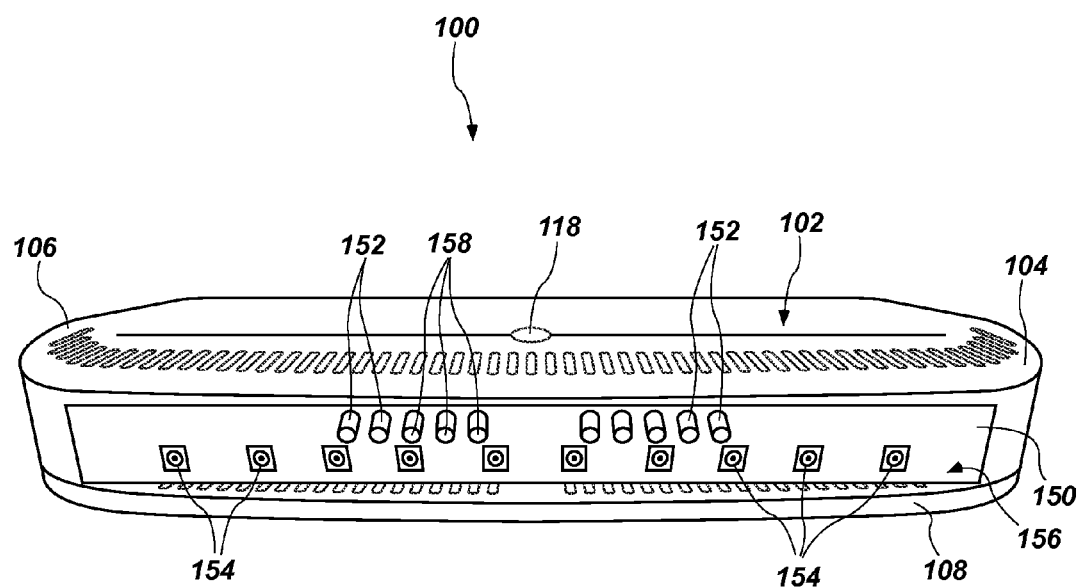
FIG. 4 is a front perspective view of the transmitter of an infrared audio system with a front panel removed according to an embodiment of the present disclosure.

FIG. 4 is a front view of the transmitter 102 of the infrared audio system 100 with the front panel 110 (FIG. 1) of the enclosure 104 removed to better show internal components of the transmitter 102. The transmitter 102 may include a mounting board 150, a plurality of narrow angle LED emitters 152, and a plurality of wide angle LED emitters 154. The plurality of narrow angle LED emitters 152 and the plurality of wide angle LED emitters 154 may be mounted on a front surface 156 of the mounting board 150 of the transmitter 102. In some embodiments, the mounting board 150 may be a circuit board of the transmitter 102. In some embodiments, the mounting board 150 may include a plate specifically dedicated for having the plurality of narrow angle LED emitters 152 and the plurality of wide angle LED emitters 154 mounted to the mounting board 150.

Each narrow angle LED emitter 152 of the plurality of narrow angle LED emitters 152 may have a narrow viewing angle. As used herein the term "viewing angle" may refer a maximum angle at which IR light emitted by one of the LED emitters 152, 154 can be viewed (e.g., viewed with a device capable of viewing IR light). The viewing angle may extend angular to both sides of a center axis of the viewing angle. The center axis of the viewing angle may extend directly in front of a respective LED emitter. For example, the center axis of the viewing angle may be normal to the mounting board 150 when the LED emitter is mounted to the mounting board 150. In some embodiments, the narrow viewing angle of each narrow angle LED emitter 152 of the plurality of narrow angle LED emitters 152 may extend angular at least some angle to both sides of the center axis of the narrow viewing angle of a respective narrow angle LED emitter 152. In some embodiments, the narrow viewing angle may be within a range of 5° to 35°. In other embodiments, the angle may be within a range of 15° to 25°. In other embodiments, the narrow viewing angle may be at least about 20°. In other words, in some embodiments, the narrow viewing angle of each narrow angle LED emitter 152 of the plurality of narrow angle LED emitters 152 may be at least about 40°.

Each wide angle LED emitter 154 of the plurality of wide angle LED emitters 154 may have a wide viewing angle. In some embodiments, the wide viewing angle of each wide angle LED emitter 154 of the plurality of wide angle LED emitters 154 may extend angular at least some angle to both sides of a center axis of the wide viewing angle of a respective wide angle LED emitter 154. In some embodiments, the wide viewing angle may be within a range of 45° to 75°. In other embodiments, the wide viewing angle may be within a range of 50° to 70°. In other embodiments, the wide viewing angle may be at least about 60°. In other words, in some embodiments, the wide viewing angle of each wide angle LED emitter 154 of the plurality of wide angle LED emitters 154 may be at least about 120°.

In some embodiments, each narrow angle LED emitter 152 of the plurality of narrow angle LED emitters 152 may include a lens 158 formed over a diode of the narrow angle LED emitter 152 and configured to focus the IR light. In some embodiments, a size (e.g., size of angle) of the narrow viewing angle of each narrow angle LED emitter 152 of the plurality of narrow angle LED emitters 152 may be determined by a shape and composition of a respective lens 158.

In some embodiments, each wide angle LED emitter 154 of the plurality of wide angle LED emitters 154 may not include such a lens 158. Not having a lens 158, may allow each wide angle LED emitter 154 of the plurality of wide angle LED emitters 154 to have a wide viewing angle. In other embodiments, each wide angle LED emitter 154 of the plurality of wide angle LED emitters 154 may include a lens 158 sized and shaped to provide a wide viewing angle for each wide angle LED emitter 154 of the plurality of wide angle LED emitters 154.

In some embodiments, the transmitter 102 may include a combination of different groups of both wide angle and narrow angle LED emitters. For example, the transmitter 102 may include a first group of narrow angle LED emitters having a viewing angle of 20° and a second group of narrow angle LED emitters having a viewing angle of 40°. The transmitter 102 may further include a first group of wide angle LED emitters having a viewing angle of 50° and a second group of narrow angle LED emitters having a viewing angle of 75°. Other angles and combinations of groups are also contemplated.

In some embodiments, the plurality of narrow angle LED emitters 152 may be oriented on the mounting board 150 in a linear fashion. In other words, the plurality of narrow angle LED emitters 152 may be oriented next to each other in a line. In some embodiments, the plurality of narrow angle LED emitters 152 may include at least two groups of narrow angle LED emitters 152 oriented on the mounting board 150 in a linear fashion. A first group of the at least two groups of narrow angle LED emitters 152 may be located on a first side of a central lateral axis of the mounting board 150, and a second group of the at least two groups of narrow angle LED emitters 152 may be located on a second opposite side of the central lateral axis of the mounting board 150.

In some embodiments, the plurality of wide angle LED emitters 154 may be oriented on the mounting board 150 in a linear fashion. In other words, the plurality of wide angle LED emitters 154 may be oriented next to each other in a line.

In some embodiments, the plurality of narrow angle LED emitters 152 may be oriented above the plurality of wide angle LED emitters 154 relative to a surface (e.g., a surface of a table) on which the transmitter 102 may be place. In other embodiments, the plurality of narrow angle LED emitters 152 may be oriented along a line that is collinear with a line along which the plurality of wide angle LED emitters 154 is oriented. In other words, the plurality of narrow angle LED emitters 152 may be interspersed among the plurality of wide angle LED emitters 154. In other embodiments, the plurality of narrow angle LED emitters 152 may be oriented below the plurality of wide angle LED emitters 154 relative to a surface on which the transmitter 102 may be placed. Although specific orientations of the plurality of narrow angle LED emitters 152 and the plurality of wide angle LED emitters 154 are described herein, the plurality of narrow angle LED emitters 152 and the plurality of wide angle LED emitters 154 may be oriented in any orientation. For example, the one or more of the plurality of narrow angle LED emitters 152 and the plurality of wide angle LED emitters 154 may be oriented in one or more of a circular, rectangular, triangular, etc., fashion.

In some embodiments, the plurality of narrow angle LED emitters 152 and the plurality of wide angle LED emitters 154 may face in a direction that is normal to the front surface 156 of the mounting board 150. As used herein, an LED emitter may "face" in a direction that is collinear with a center axis of a viewing angle of the LED emitter. In other words, in some embodiments, the plurality of narrow angle LED emitters 152 and the plurality of wide angle LED emitters 154 may not face in a direction that defines an acute angle with the front surface 156 of the mounting board 150. In other embodiments, at least some of the plurality of narrow angle LED emitters 152 and the plurality of wide angle LED emitters 154 may face in a direction that defines an acute angle with the front surface 156 of the mounting board 150.

Figure 5:
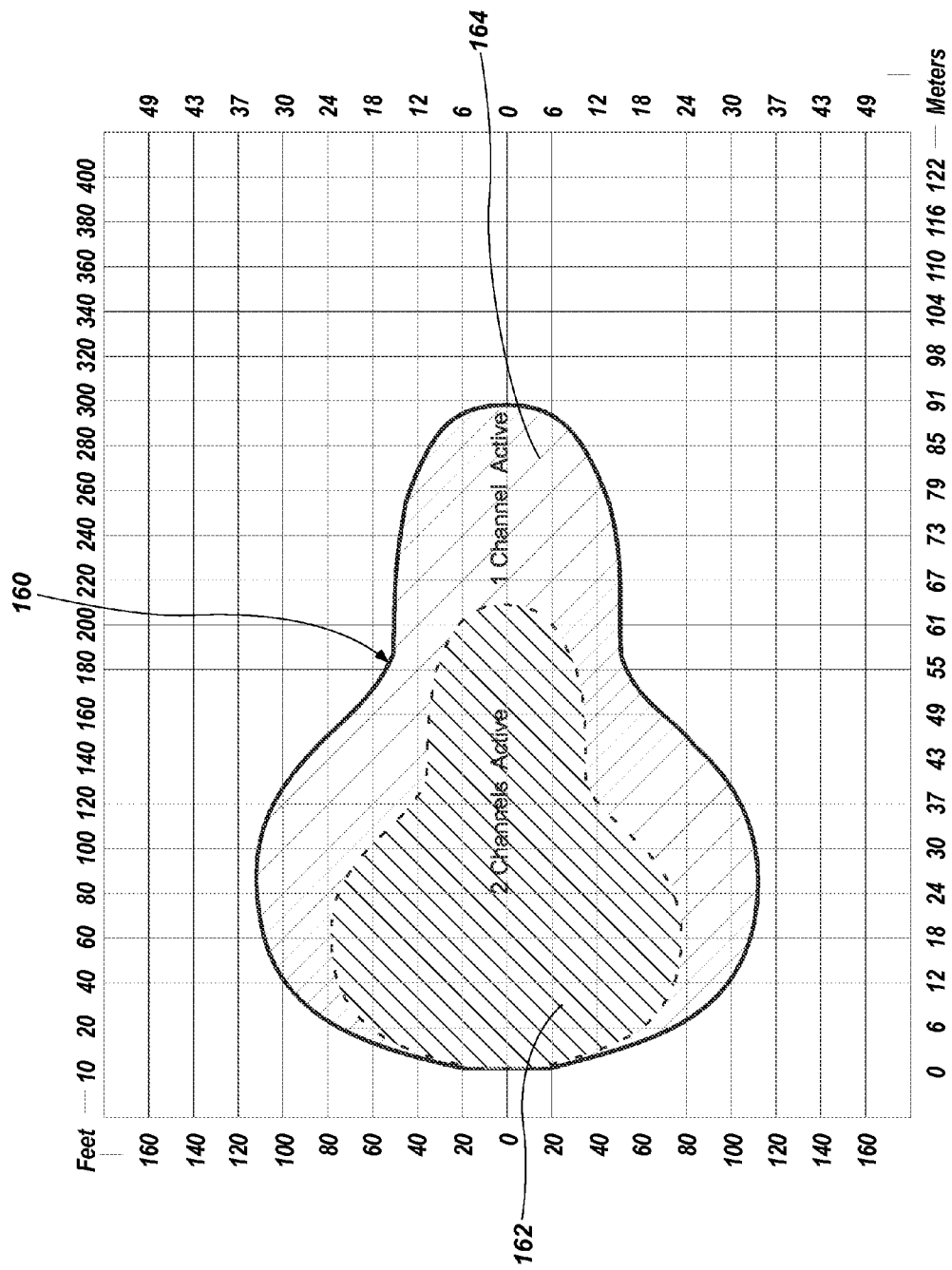
FIG. 5 is a schematic view of a beam of infrared light emitted by an infrared audio system according to an embodiment of the present disclosure.

FIG. 5 shows a schematic representation of a beam of IR light 160 emitted by the transmitter 102 (FIG. 4). Referring to FIGS. 4 and 5 together, IR light emitted by the plurality of narrow angle LED emitters 152 may merge with IR light emitted by the plurality of wide angle LED emitters 154 to form the beam of IR light 160. The beam of IR light 160 (e.g., footprint of the IR light) may have a general gourd shape having a wide portion 162 and a narrow portion 164. The wide portion 162 of the beam of IR light 160 may be most proximate the transmitter 102, and the narrow portion 164 of the beam of IR light 160 may be distal to the transmitter 102 and may extend from the wide portion 162 in a direction parallel the center axes of the viewing angles of the LED emitters 152, 154 and away from the transmitter 102.

As discussed previously, the transmitter 102 may have a single channel transmit mode and a double channel transmit mode. In some embodiments, when the transmitter 102 is transmitting in a single channel transmit mode (i.e., one channel active), a maximum longitudinal length of the beam of IR light 160 (e.g., length in a direction parallel the center axes of the viewing angles of the LED emitters 152, 154) may be at least about 298 ft. (about 90 m). Furthermore, a maximum width of the beam of IR light 160 may be located within the wide portion 162 of the beam of IR light 160 and may be at least about 220 ft. (about 66 m). In some embodiments, the maximum width of the wide portion 162 of the beam of IR light 160 may occur about 90 ft. (about 27 m) away from the transmitter 102 in a direction parallel the center axes of the viewing angles of the LED emitters 152, 154. The narrow portion 164 of the beam of IR light 160 may have a maximum width of at least about 100 ft. (about 30 m).

When the transmitter 102 is transmitting in a double channel transmit mode (i.e., two channels active), the maximum longitudinal length of the beam of IR light 160 may be at least about 210 ft. (about 64 m). Furthermore, the maximum width of the beam of IR light 160 may be at least about 160 ft. (about 48 m). In some embodiments, the maximum width of the wide portion 162 of the beam of IR light 160 may occur about 60 ft. (about 18 m) away from the transmitter 102 in a direction parallel the center axes of the viewing angles of the LED emitters 152, 154. The narrow portion 164 of the beam of IR light 160 may have a maximum width of at least about 60 ft. (about 20 m).

The footprint of IR light 160 produced by the combination of the IR light emitted by the plurality of wide angle LED emitters 154 and the IR light emitted by the plurality of narrow angle LED emitters 152 of the transmitter 102 may provide significantly wider coverage proximate the transmitter 102 when compared with known infrared transmitters. Thus, the transmitter 102 of the present disclosure may provide advantages over other known transmitters because the transmitter 102 may provide adequate coverage on lateral sides of rectangular or square rooms (e.g., wide rooms). Furthermore, the transmitter 102 may be able to provide adequate coverage in wide rooms without needing a cost prohibitive number of LED emitters. Thus, the transmitter 102 may be able to provide better coverage for a cheaper production cost in comparison to known transmitters. As a result, the transmitter 102 may require a fewer number of LED emitters in order to cover given area in comparison to known transmitters. Moreover, by having all of the LED emitters 152, 154 of the transmitter 102 face the same direction, problems with the IR light arriving to receiving out of phase (e.g., with latencies) may be reduced.

Additionally, mounting LED emitters 152, 154 at acute angles relative to mounting boards can be complex and costly. Thus, the transmitter 102 of the current disclosure may provide a more affordable solution to providing audio signals to wide environments than known transmitters. Moreover, having a large number of LED emitters on a mounting board 150 can require a large power supply. For example, in some cases, a voltage drop across each LED emitter of about two volts can be experienced. In other words, the larger the number of LED emitters that is required, the larger a starting voltage of the power supply is required. Accordingly, by lowering a number of LED emitters 152, 154 required to provide coverage through a given environment, less power may be required to power the infrared audio system 100. Requiring less power may result in cost savings when using the infrared audio system 100 in comparison to using other known transmitters.

FIG. 6 is a rear perspective view of an expansion transmitter 166 of the infrared audio system 100 that may be connected to the transmitter 102 (FIG. 1) via the at least one expansion link output 128 (FIG. 3) of the transmitter 102 (FIG. 1). Referring to FIGS. 1 and 6 together, the expansion transmitter 166 may be used in conjunction with the transmitter 102 to increase a size of the beam of IR light 160 (FIG. 5) produced by the infrared audio system 100. Thus, the coverage of the infrared audio system 100 within an area can be increased by connecting an expansion transmitter 166 to the transmitter 102. The expansion transmitter 166 may have a structure similar to the transmitter 102. For example, the expansion transmitter 166 may include an enclosure 168 similar to the enclosure 104 of the transmitter 102.

FIG. 7 is a front perspective view of an expansion transmitter 166 with a front panel of the enclosure 168 removed to better show internal components of the expansion transmitter 166. Referring to FIGS. 1 and 7 together, similar to the transmitter 102, the expansion transmitter 166 may include a mounting board 170, a plurality of narrow angle LED emitters 172, and a plurality of wide angle LED emitters 174. The mounting board 170, the plurality of narrow angle LED emitters 172, and the plurality of wide angle LED emitters 174 of the expansion transmitter 166 may be similar to the same elements of the transmitter 102 and may function in the same manner discussed above in regard to the transmitter 102.

FIG. 8 is a front side view of a rear panel 176 of the expansion transmitter 166. Referring to FIGS. 1 and 8 together, the rear panel of the expansion transmitter 166 may include at least one expansion link input 178, at least one expansion link output 180, a plurality of green LED power indicators 182, and a plurality of amber LED status indicators 184, a first channel delay compensator switch 186, and a second channel delay compensator switch 188, an indicator lights on/off switch 190, and a safety/security cable slot 192. The at least one expansion link input 178 of the expansion transmitter 166 may accept a cable 148 (e.g., CAT-5e cable), which may in turn be connected to an expansion link output 128 of the transmitter 102. The at least one expansion link output 180 of the expansion transmitter 166 may allow an additional expansion transmitter to be connected to the expansion transmitter 166, which in turn is connected to the transmitter 102, as described in further detail in regard to FIG. 9

The first channel delay compensator switch 186 and second channel delay compensator switch 188 may be used to compensate for latencies (i.e., short periods of delay between when an audio signal enters a system and when it emerges) that may be present in audio signals provided to the expansion transmitter 166 and further expansion transmitters. Latencies in the audio signals may be present due to analog-to-digital conversion, buffering, digital signal processing, transmission time, digital-to-analog conversion, speed of sound in air, etc. For example, latencies in the audio signals provided to the expansion transmitter 166 may be due to a length of a cable 148 between the transmitter 102 and the expansion transmitter 166. Each of the first channel delay compensator switch 186 and the second channel delay compensator switch 188 may include a four-position switch, and the four-position switch may be positioned based on a length of the cable 148 between the transmitter 102 and the expansion transmitter 166.

Figure 9:
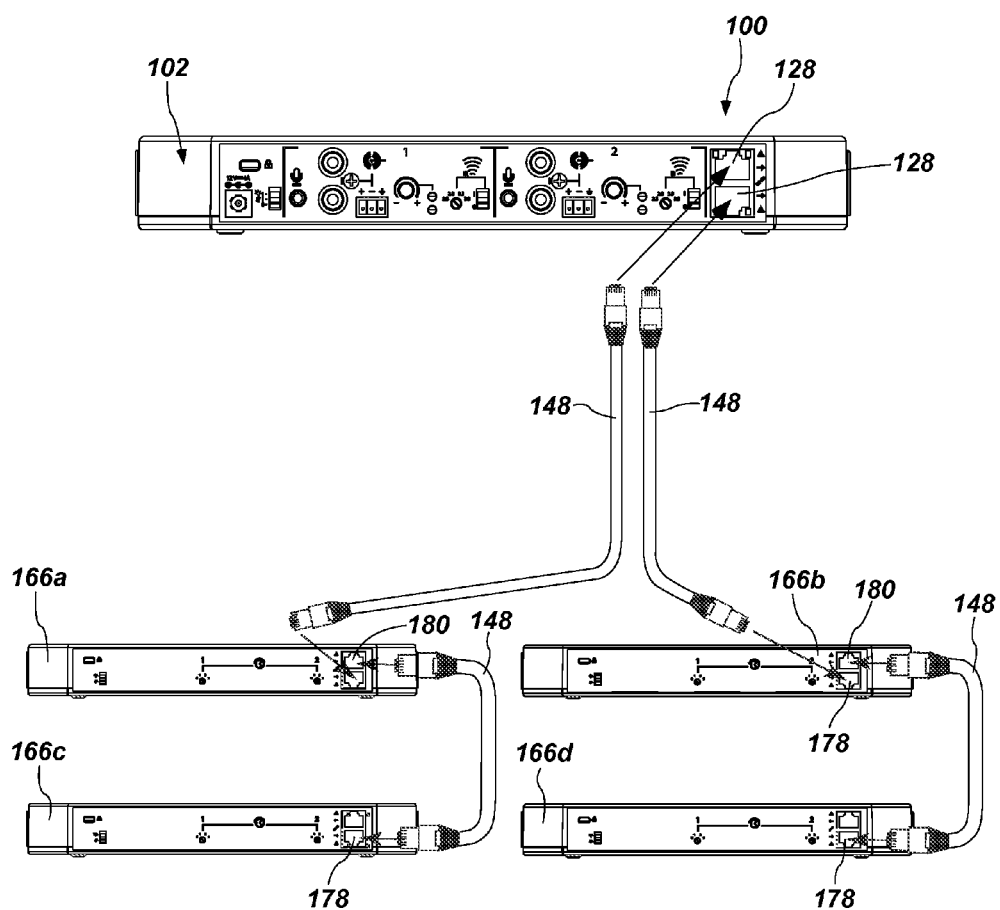
FIG. 9 is a schematic view of an infrared audio system according to another embodiment of the present disclosure.

FIG. 9 shows an infrared audio system 100 having a transmitter 102 connected to multiple expansion transmitters. In some embodiments, the transmitter 102 may be directly connected to a first expansion transmitter 166a and a second expansion transmitter 166b via cables 148 (e.g., CAT-5e cables) that are inserted into the expansion link outputs 128 of the transmitter 102 and into the expansion link input 178 of the first expansion transmitter 166a and the expansion link input 178 of the second expansion transmitter 166b. In some embodiments, the first expansion transmitter 166a may be directly connected to a third expansion transmitter 166c via a cable 148 that is inserted into the expansion link output 180 of the first expansion transmitter 166a and into the expansion link input 178 of the third expansion transmitter 166c. Furthermore, the second expansion transmitter 166b may be directly connected to a fourth expansion transmitter 166d via a cable 148 that is inserted into the expansion link output 180 of the second expansion transmitter 166b and into the expansion link input 178 of the fourth expansion transmitter 166d.

Thus, the transmitter 102 may be connected to multiple expansion transmitters in a daisy chain fashion (i.e., connected together in series). In some embodiments, the transmitter 102 may be connected to up to four additional expansion transmitters 166 (e.g., two expansion transmitters per expansion link output 128 of the transmitter 102). In other embodiments, the transmitter 102 may be connected to up to six additional expansion transmitters 166 (e.g., three expansion transmitters per expansion link output 128 of the transmitter 102).

Figure 10:
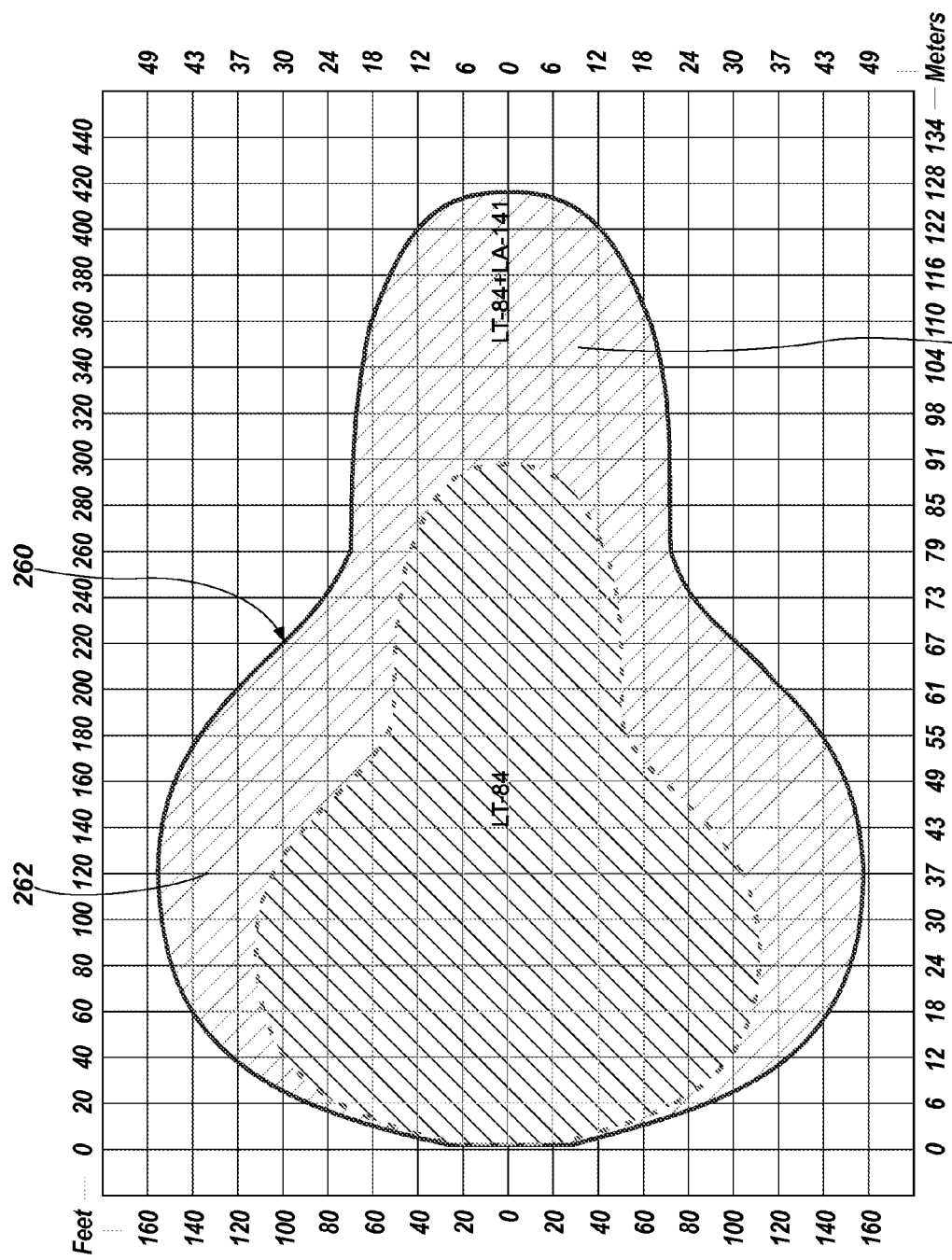
FIG. 10 is a schematic view of a beam of infrared light emitted by an infrared audio system according to another embodiment of the present disclosure.

FIG. 10 shows a schematic representation of a beam of IR light 260 emitted by an infrared audio system 100 (FIG. 1) when a transmitter 102 (FIG. 1) and an expansion transmitter 166 (FIG. 7) are used together. Referring to FIGS. 1, 4, 7, and 10 together, IR light from the transmitter 102 and IR light emitted by the expansion transmitter 166 may merge to form the beam of IR light 260 emitted by the infrared audio system 100. The beam of IR light 260 shown in FIG. 10 may be emitted when the transmitter 102 and expansion transmitter 166 are facing in the same direction (e.g., the center axes of the viewing angles of the LED emitters 152, 154 of the transmitter 102 and the center axes of the viewing angles of the LED emitters 172, 174 of the expansion transmitter 166 are extending in the same direction) and when the IR light emitted by the transmitter 102 and the IR light emitted by the expansion transmitter 166 are originating from at least substantially the same place. For example, the expansion transmitter 166 may be placed on top of or directly adjacent to the transmitter 102.

When the transmitter 102 and the expansion transmitter 166 are used together, a size of the beam of IR light 260 emitted by the infrared audio system 100 may be at least about 40% larger than a beam of IR light 260 emitted by an infrared audio system 100 just including the transmitter 102. For example, when the transmitter 102 and expansion transmitter 166 are transmitting in a single channel transmit mode (i.e., one channel active), a maximum longitudinal length of the beam of IR light 260 (e.g., length in a direction parallel the center axes of the viewing angles of the LED emitters 152, 154, 172, 174 of the transmitter 102 and expansion transmitter 166) may be at least about 418 ft. (about 127 m). Furthermore, a maximum width of the beam of IR light 260 may be located within the wide portion 262 of the beam of IR light 260 and may be at least about 316 ft. (about 98 m). In some embodiments, the maximum width of the narrow portion 164 of the beam of IR light 260 may occur about 120 ft. (about 37 m) away from the transmitter 102 in a direction parallel the center axes of the viewing angles of the LED emitters 152, 154. The narrow portion 264 of the beam of IR light 260 may have a maximum width of at least about 140 ft. (about 40 m).

Figure 11:
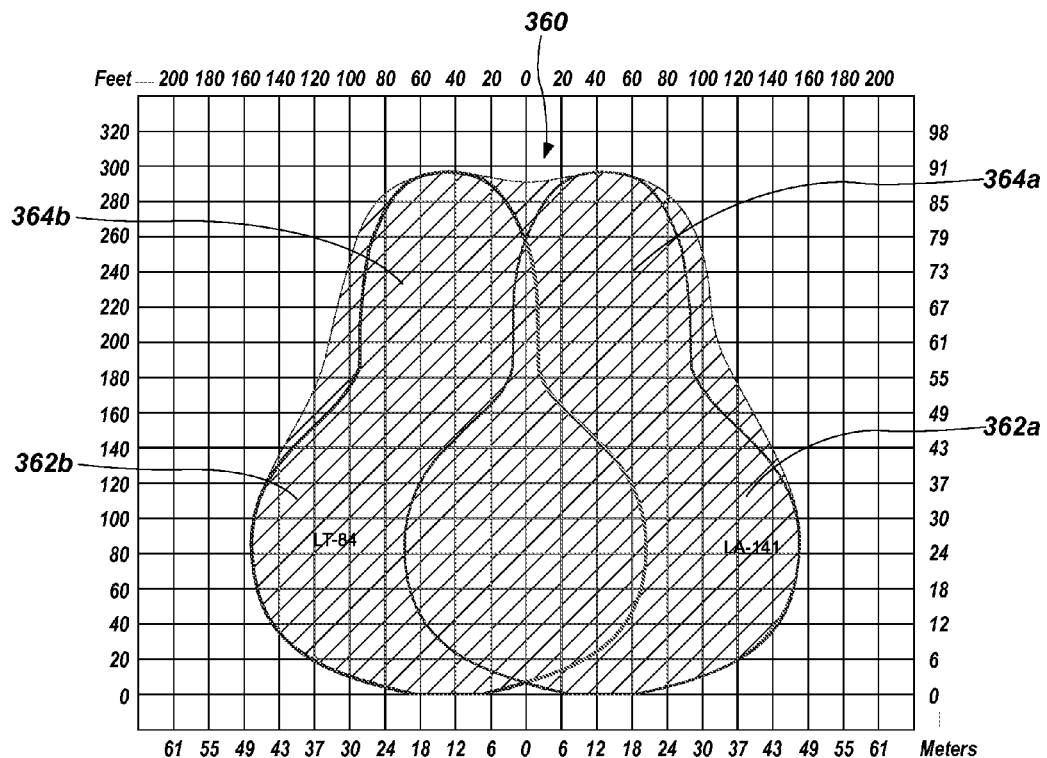
FIG. 11 is a schematic view of a beam of infrared light emitted by an infrared audio system according to another embodiment of the present disclosure.

FIG. 11 shows a schematic representation of another beam of IR light 360 emitted by a transmitter 102 (FIG. 1) and an expansion transmitter 166 (FIG. 7) when the transmitter 102 (FIG. 1) and expansion transmitter 166 (FIG. 7) are used together. Referring to FIGS. 1, 7, and 11 together, the beam of IR light 360 may be emitted when the transmitter 102 and expansion transmitter 166 are facing in the same direction but are spaced laterally from one another by a distance. For example, the beam of IR light 260 shown in FIG. 10 may be emitted by a transmitter 102 and an expansion transmitter 166 that are separated from each other laterally by at least about twenty-four feet. Although a specific distance is described, the transmitter 102 and expansion transmitter 166 may be separated by any distance. In this specific example, the beam of IR light 360 may have two narrow portions 364a, 364b and two wide portions 362a, 362b. In some embodiments, the two wide portions 362a, 362b may at least partially overlap with each other. In some embodiments, the two narrow portions 364a, 364b may at least partially overlap with each other.

Figure 12:
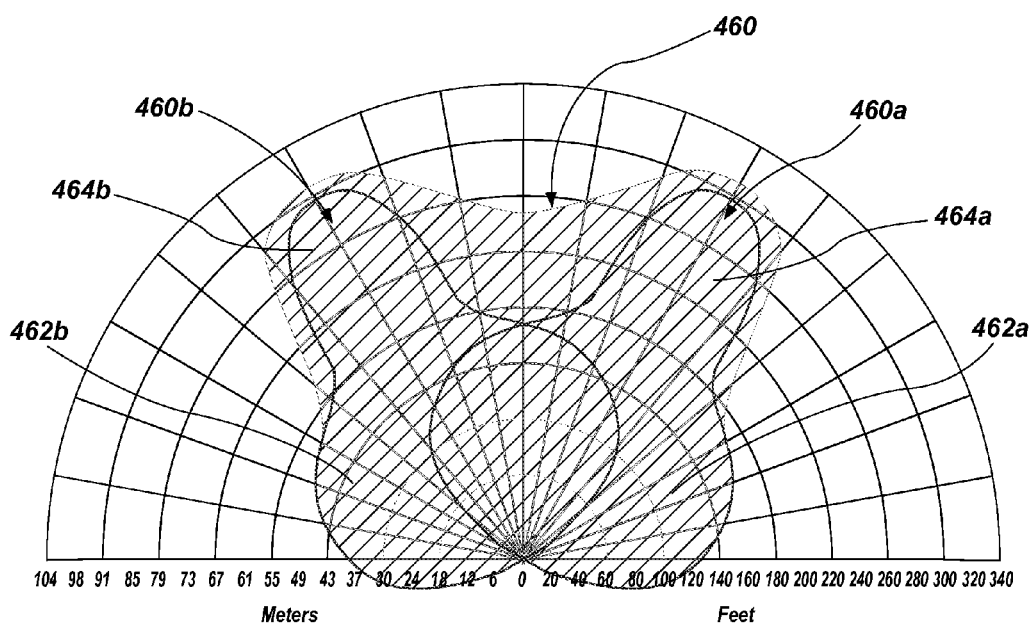
FIG. 12 is a schematic view of a beam of infrared light emitted by an infrared audio system according to another embodiment of the present disclosure.

FIG. 12 shows a schematic representation of another beam of IR light 460 emitted by a transmitter 102 (FIG. 1) and an expansion transmitter 166 (FIG. 7) when the transmitter 102 (FIG. 1) and the expansion transmitter 166 (FIG. 7) are used together. Referring to FIGS. 1, 7, and 12 together, the beam of IR light 460 may be emitted when the transmitter 102 and expansion transmitter 166 are facing in different directions but are located proximate to each other. In other words, a beam of IR light 460a emitted by the transmitter 102 and a beam of IR light 460b emitted by the expansion transmitter 166 (referred to herein together as beam of IR light 460) may each originate from at least substantially the same spot. In this specific example, the beam of IR light 460 may have two narrow portions 464a, 464b and two wide portions 462a, 462b. In some embodiments, the two wide portions 462a, 462b may at least partially overlap with each other.

A direction in which the transmitter 102 is facing may form an angle with a direction in which the expansion transmitter 166 is facing. In other words, a longitudinal axis of a beam of IR light 460a emitted by the transmitter 102 may form the angle with a longitudinal axis of a beam of IR light 460b emitted by the expansion transmitter 166. In some embodiments, the angle may be at least about 15°. In other embodiments, the angle may be at least about 30°. Although specific angles are described herein, the angle may be any angle between 0° and 180°.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A transmitter for transmitting audio signals via infrared light, comprising:
    an enclosure comprising:
    a top panel;
    a bottom panel; and
    a front panel and a rear panel extending between the top panel and the bottom panel;
    a mounting board disposed within the enclosure and proximate the front panel of the enclosure;
    a plurality of narrow angle LED emitters disposed on a front surface of the mounting board; and
    a plurality of wide angle LED emitters disposed on the front surface of the mounting board, wherein the plurality of narrow angle LED emitters and the plurality of wide angle LED emitters are configured to emit a beam of infrared light having a wide portion and narrow portion, the wide portion being proximate the transmitter and the narrow portion being distal to the transmitter and at least one expansion transmitter.

2. The transmitter of claim 1, wherein each narrow angle LED emitter of the plurality of narrow angle LED emitters has a viewing angle within a range of 30° to 50°.

3. The transmitter of claim 1, wherein each wide angle LED emitter of the plurality of wide angle LED emitters has a viewing angle within a range of 100° to 140°.

4. The transmitter of claim 1, wherein each narrow angle LED emitter of the plurality of narrow angle LED emitters has a lens shaped and configured to focus infrared light emitted by the narrow angle LED emitter.

5. The transmitter of claim 1, wherein the plurality of wide angle LED emitters includes at least ten wide angle LED emitters.

6. The transmitter of claim 1, wherein the plurality of narrow angle LED emitters includes at least ten narrow angle LED emitters.

7. The transmitter of claim 1, further comprising at least one expansion output in the rear panel of the enclosure of the transmitter for attaching the at least one expansion transmitter to the transmitter.

8. The transmitter of claim 1, wherein the plurality of narrow angle LED emitters and the plurality of wide angle LED emitters are configured to emit a beam of infrared light having a wide portion and narrow portion, the wide portion being proximate the plurality of narrow angle LED emitters and the plurality of wide angle LED emitters and the narrow portion being distal to the plurality of narrow angle LED emitters and the plurality of wide angle LED emitters.

9. The transmitter of claim 8, wherein the wide portion of the beam of infrared light has a maximum width of at least about 220 feet.

10. The transmitter of claim 8, wherein the beam of infrared light emitted by the plurality of narrow angle LED emitters and the plurality of wide angle LED emitters has a maximum longitudinal length extending from the plurality of narrow angle LED emitters and the plurality of wide angle LED emitters of at least about 155 feet.

11. An infrared audio system for transmitting audio signals via infrared light, comprising:
    a transmitter, comprising:
    a first mounting board;
    a first plurality of narrow angle LED emitters mounted to the first mounting board; and
    a first plurality of wide angle LED emitters mounted to the first mounting board; and
    at least one expansion transmitter connected to the transmitter via at least one cable, comprising:
    a second mounting board;
    a second plurality of narrow angle LED emitters mounted to the second mounting board; and
    a second plurality of wide angle LED emitters mounted to the second mounting board, wherein the first plurality of narrow angle LED emitters, the first plurality of wide angle LED emitters, the second plurality of narrow angle LED emitters, and the second plurality of wide angle LED emitters are configured to emit a beam of infrared light having a wide portion and narrow portion, the wide portion being proximate the transmitter and the at least one expansion transmitter and the narrow portion being distal to the transmitter and the at least one expansion transmitter.

12. The infrared audio system of claim 11, wherein the at least one expansion transmitter comprises:
    a first expansion transmitter connected to the transmitter via a first cable; and
    a second expansion transmitter connected to the transmitter via a second cable.

13. The infrared audio system of claim 12, wherein the at least one expansion transmitter further comprises:
    a third expansion transmitter connected to the first expansion transmitter via a third cable; and
    a fourth expansion transmitter connected to the second expansion transmitter via a fourth cable.

14. The transmitter of claim 11, wherein the wide portion of the beam of infrared light has a maximum width of at least about 316 feet.

15. The transmitter of claim 11, wherein the beam of infrared light emitted by the transmitter and the at least one expansion transmitter has a maximum longitudinal length extending from the transmitter and the at least one expansion transmitter of at least about 415 feet.

16. The transmitter of claim 11, wherein the at least one expansion transmitter is connected to the transmitter with cable inserted into an expansion link output of the transmitter and an expansion link input of the at least one expansion transmitter.

17. The transmitter of claim 11, wherein each narrow angle LED emitter of the first plurality of narrow angle LED emitters of the transmitter and the second plurality of narrow angle LED emitters has a viewing angle within a range of 30° to 50° and wherein each wide angle LED emitter of the first plurality of wide angle LED emitters of the transmitter and the second plurality of wide angle LED emitters has a viewing angle within a range of 100° to 140°.

18. A method of making a transmitter for transmitting audio signals via infrared light, comprising:
attaching a plurality of narrow angle LED emitters to a mounting board of the transmitter, the plurality of narrow angle LED emitters having a total viewing angle within a range of 30° to 50°; and
attaching a plurality of wide angle LED emitters to the mounting board of the transmitter, the plurality of wide angle LED emitters having a total viewing angle within a range of 100° to 140°, wherein the plurality of narrow angle LED emitters and the plurality of wide angle LED emitters are configured to emit a beam of infrared light having a wide portion and narrow portion, the wide portion being proximate the transmitter and the narrow portion being distal to the transmitter and at least one expansion transmitter.

19. The method of claim 18, further comprising:
attaching the plurality of narrow angle LED emitters to the mounting board such that a center axis of the viewing angle of each narrow angle LED emitter of the plurality of narrow angle LED emitters is oriented at least substantially normal to a surface of the mounting board to which the plurality of narrow angle LED emitters are attached; and
attaching the plurality of wide angle LED emitters to the mounting board such that a center axis of the viewing angle of each wide angle LED emitter of the plurality of wide angle LED emitters is oriented at least substantially normal to the surface of the mounting board to which the plurality of wide angle LED emitters are attached.

* * * * *